United States Patent
Monzel

(10) Patent No.: US 8,297,322 B2
(45) Date of Patent: Oct. 30, 2012

(54) BEVERAGE FILLING PLANT FOR FILLING BEVERAGE CONTAINERS WITH A BEVERAGE HAVING A DEVICE FOR THE FEEDING AND REMOVAL OF BEVERAGE CONTAINERS

(75) Inventor: Alois Monzel, Mörstadt (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 12/830,894

(22) Filed: Jul. 6, 2010

(65) Prior Publication Data
US 2010/0269955 A1 Oct. 28, 2010

Related U.S. Application Data

(63) Continuation of application No. 12/251,071, filed on Oct. 14, 2008, now Pat. No. 7,779,874.

(51) Int. Cl.
*B65B 43/42* (2006.01)
(52) U.S. Cl. .................... 141/152; 141/165; 141/177
(58) Field of Classification Search ............. 141/1, 2, 141/9, 18, 85, 99, 104, 129, 135, 144, 145, 141/152, 163, 165, 168, 177
See application file for complete search history.

(56) References Cited

U.S. PATENT DOCUMENTS

| | | | |
|---|---|---|---|
| 3,888,065 A | 6/1975 | Heisler | |
| 3,905,177 A | 9/1975 | Herzog | |
| 4,045,940 A | 9/1977 | White et al. | |
| 4,319,612 A | 3/1982 | Golding | |
| 4,817,363 A | 4/1989 | St. Clair | |
| 5,000,661 A | 3/1991 | Bloch et al. | |
| 5,285,825 A | 2/1994 | Townsley | |

(Continued)

FOREIGN PATENT DOCUMENTS

DE 37 29 324 3/1989

(Continued)

OTHER PUBLICATIONS

European Patent Office Search Report EP 1 529 745 A1 and English translation thereof.

*Primary Examiner* — Gregory Huson
*Assistant Examiner* — Jason K Niesz
(74) *Attorney, Agent, or Firm* — Nils H. Ljungman & Associates

(57) ABSTRACT

A beverage bottling plant for filling bottles with a liquid beverage filling material having a device for the feeding and removal of containers, in particular for the feeding of upright kegs, barrels, cans, bottles and similar containers from a conveyor belt to a linear conveyor or revolving carousel turntable or also for the return of said containers to a removal conveyor belt with a star wheel, the star pockets of which or the arms of which can be brought at least partly in contact with the container and which are realized so that they can be adjusted to accommodate different containers The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

18 Claims, 6 Drawing Sheets

U.S. PATENT DOCUMENTS

| | | | |
|---|---|---|---|
| 5,713,403 A * | 2/1998 | Clusserath et al. | 141/101 |
| 5,893,259 A * | 4/1999 | Posge | 53/448 |
| 6,141,943 A * | 11/2000 | Hart et al. | 53/444 |
| 6,170,232 B1 | 1/2001 | VandeGeijn | |
| 6,276,113 B1 | 8/2001 | Bernhard | |
| 6,311,462 B2 | 11/2001 | Amborn et al. | |
| 6,481,188 B1 | 11/2002 | Graham et al. | |
| 2001/0045242 A1 | 11/2001 | Clusserath et al. | |

FOREIGN PATENT DOCUMENTS

| | | |
|---|---|---|
| DE | 101 54 203 | 6/2002 |
| DE | 101 07 004 | 9/2002 |
| EP | 405402 | 1/1991 |
| EP | 0 629 569 | 12/1994 |
| GB | 1 043 868 | 9/1966 |
| WO | WO 96/08434 | 3/1996 |

\* cited by examiner

BEVERAGE FILLING PLANT FOR FILLING BEVERAGE CONTAINERS WITH A BEVERAGE HAVING A DEVICE FOR THE FEEDING AND REMOVAL OF BEVERAGE CONTAINERS

CONTINUING APPLICATION DATA

This application is a continuation of U.S. application Ser. No. 12/251,071, filed on Oct. 14, 2008, which is a continuation of U.S. application Ser. No. 10/985,640, filed on Nov. 10, 2004. U.S. application Ser. No. 12/251,071 was pending as of the filing date of the present application.

BACKGROUND

1. Technical Field

The present application relates to a beverage filling plant for filling beverage containers with a beverage having a device for the feeding and removal of kegs, barrels, drums, casks, cans and similar containers from a conveyor belt to a linear conveyor or revolving carousel turntable as well as for the return of said containers to a removal conveyor belt with a star wheel as described herein below.

2. Background Information

A beverage filling plant for filling beverage containers with a beverage can possibly comprise a beverage filling machine with a plurality of beverage filling positions, each beverage filling position having a beverage filling device for filling beverage containers with a liquid beverage. The filling devices may have an apparatus designed to introduce a predetermined volume of liquid beverage into the interior of beverage containers to a substantially predetermined level of liquid beverage. The apparatus designed to introduce a predetermined flow of liquid beverage further comprises an apparatus that is designed to terminate the filling of the beverage containers upon the liquid beverage reaching the predetermined level in the beverage containers.

Devices of this type are used in container handling machines, for example. The containers are fed upright and in the correctly oriented position to the handling machine on a conveyor belt, whereby the container inlet and outlet are each in the form of a star wheel. The inlet star wheel conveys the containers to the carousel turntable of the machine and the outlet star wheel removes the handled containers from the machine and transports them back onto the removal conveyor belt that runs past said machine.

However, devices of this type can also be used for other cylindrical containers and other machines, for example bottling and labeling machines, inspection and test machines, drum filling machines etc. It is thereby customary to provide a specific set of star wheels for each container diameter.

In the prior art, devices of this type have two coaxial star wheels that are non-rotationally connected to each other, whereby one arm forms a rear stop for the containers to be guided, and located between these two star wheels is a central, coaxial star wheel, of which the arms facing the one, above mentioned arm form a front stop for the containers, and means are provided to rotate the center star wheel with respect to the star wheel pair by such an angle that the device can be adapted to accommodate containers with different diameters.

OBJECT OR OBJECTS

On the basis of the prior art as described above, the object of the present application is to create a suitable feeding and/or removal device for different containers in which there is essentially no need for adjustable or convertible star parts or star pocket levels that can be rotated in relation to each other.

SUMMARY

This task is accomplished by a device for the feeding and removal of containers, in particular for the feeding of upright barrels, cans, bottles and similar containers from a conveyor belt to a linear conveyor or revolving carousel turntable or also for the return of said containers to a removal conveyor belt with a star wheel, the star pockets of which or the arms of which can be brought at least partly in contact with the container and which are realized so that they can be adjusted to accommodate different containers, in which the pushing and/or centering arms or faces of the star wheel can be driven independently and can be adjusted in their rotational position to accommodate different container diameters by a rotational adjustment to the current container cylinder diameter, with reference to the container midpoint, and to the corresponding position in the machine.

In one independent configuration of an embodiment, the pushing and/or centering arms of the star wheel can be advanced or retracted, or moved forward or moved backward, by the partial amount of the center offset of the respective different container diameters and/or can be brought into the pushing position.

With this configuration taught by the present application, it is possible to achieve any desired relative position adjustment and thus an individual adaptation to different container diameters with an independent drive of the star wheel, without the need for mechanical or other adjustments to the feeder and/or discharge star wheel. The conversion is made by setting the device to the current container size to be processed, whereby the arms of the star wheel or the star wheel itself are positioned automatically by means of synchronous motors, servo motors, stepper motors or other suitable drive motors and the corresponding actuation and/or control modules such as, for example, rotary encoders, control cards, PCs, software etc., thereby ensuring a correct positioning of the containers in the desired transfer position.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Possible embodiments are described in greater detail below with reference to a simplified exemplary embodiment for the transfer of a container into a handling machine. Analogous considerations apply to the conditions and sequences of operations in the transfer of such a container from the handling machine to the discharge-side conveyor for the removal of the container.

DESCRIPTION OF EMBODIMENT OR EMBODIMENTS

Figure 1:
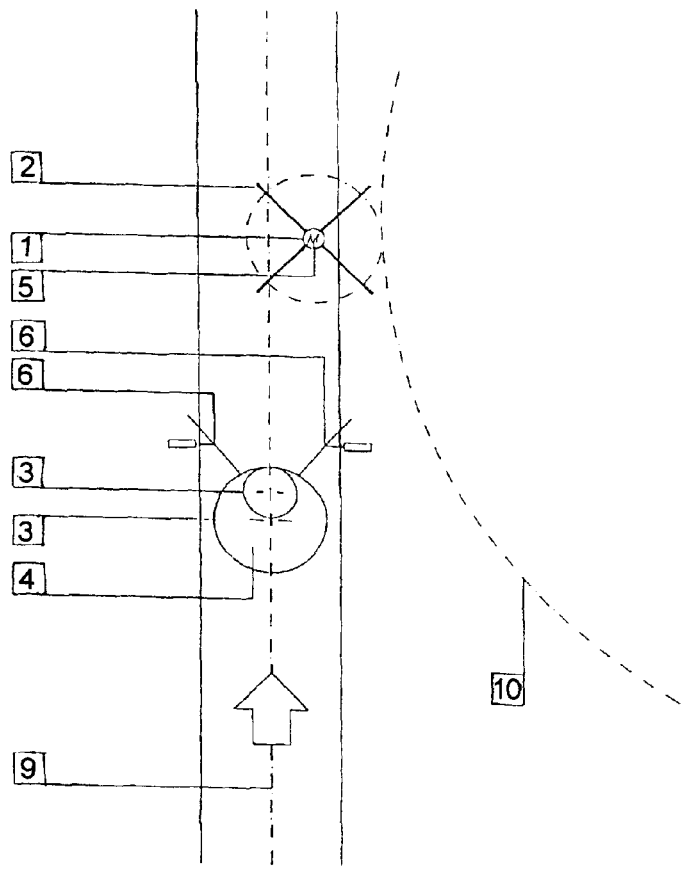
FIG. 1 shows a linear handling machine.
Figure 1A:
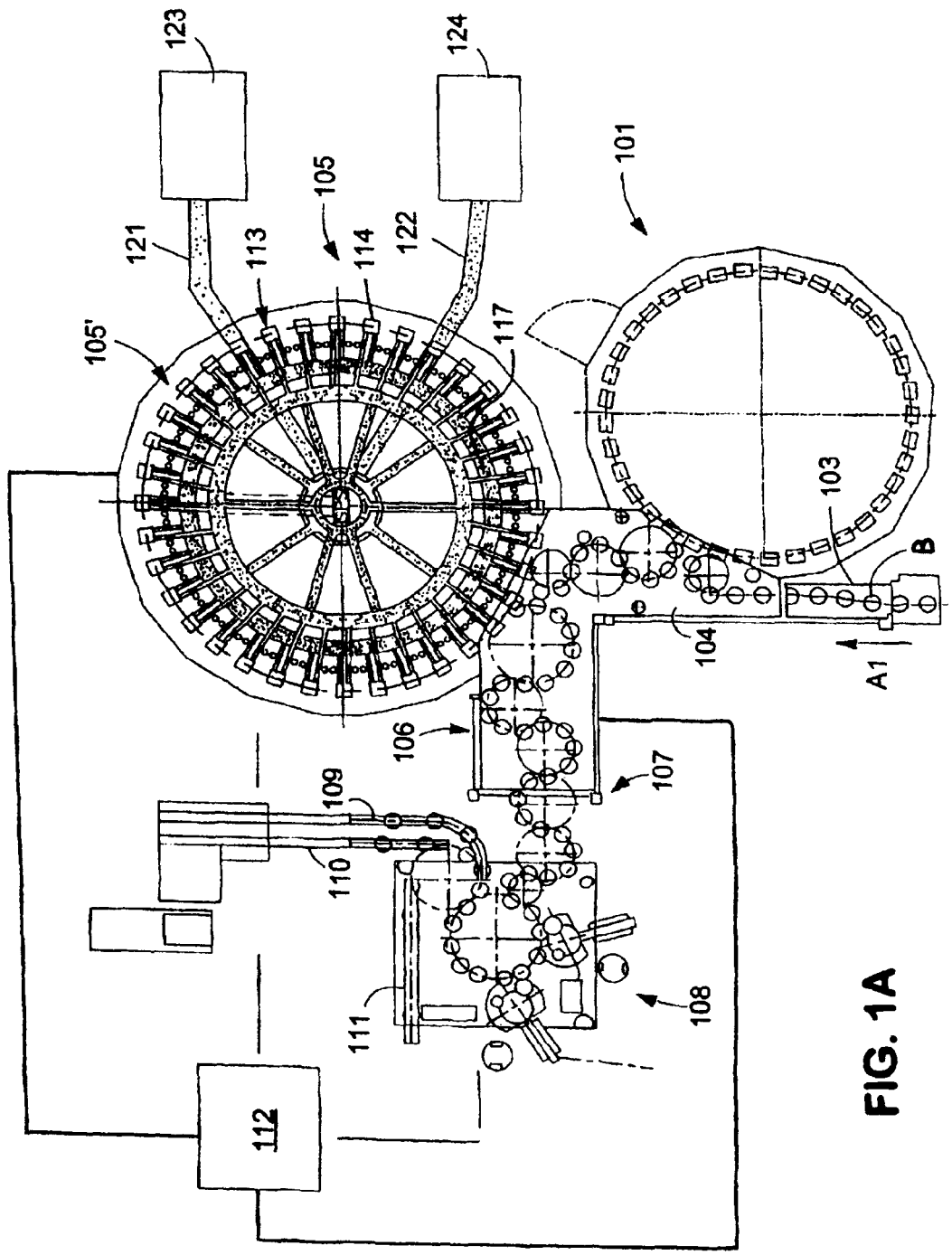
FIG. 1A is a schematic illustration of a container filling plant in accordance with one possible embodiment.

FIG. 1A shows schematically the main components of one embodiment example of a system for filling beverage containers, specifically, an embodiment of a beverage bottling plant 100 for filling bottles B with liquid beverage filling material, in accordance with one embodiment, or in which system or plant could possibly be utilized at least one aspect, or several an aspects, of the embodiments disclosed herein.

FIG. 1A shows a rinsing arrangement or rinsing station 101, to which the containers, namely bottles B, are fed in the direction of travel as is indicated by the arrow A1, by means of a conveyer line or conveyer arrangement to feed bottles to rinsing arrangement 103, and downstream of rinsing arrangement or rinsing station 101, in the direction of travel as is indicated by the arrow A1, the rinsed bottles B are transported to a beverage filling machine 105 by means of a conveyer line or conveyer arrangement 104 to pass bottles to filling machine that is formed, for example, by a starwheel conveyer or a plurality of starwheels of a conveyer arrangement. The conveyer arrangement 104 to pass bottles to filling machine may possibly comprise a starwheel conveying structure that introduces bottles B to the filling machine 105.

Downstream of the filling machine 105, in the direction of travel of the bottles B, there can preferably be a closing arrangement or closing station 106 which closes the bottles B.

The closing arrangement or closing station 106 can, for example, be connected directly to a labeling arrangement or labeling station 108 having at least one labeling unit, device, or module for first product, each unit having a head, such as, for example, by means of a conveyer arrangement 107 to pass bottles to labeling arrangement that may be formed, for example, by a plurality of starwheels of a conveyer arrangement.

In the illustrated embodiment, the labeling arrangement or labeling station 108 having at least one labeling unit, device, or module for first product, each unit having a head has, for example, three outputs, namely one output formed by a conveyer arrangement 109 to convey first product bottles for bottles B that are filled with a first product. The first product may possibly be provided by a first product mixer 123 that is connected to the filling machine 105, for example, through a conduit for first product 121, and bottles B that are filled with a predetermined volume of liquid beverage filling material, that is, the first product, are then labeled by a labeling module in the labeling arrangement or labeling station 108 having at least one labeling unit, device, or module for first product, each unit having a head, corresponding to this first product delivered from first product mixer 123 to the beverage filling machine 105 and thence to the corresponding bottles B.

A second output that is formed by a conveyer arrangement 110 to convey second product bottles is provided for those bottles B that are filled with a second product. The second product may emanate from a second product mixer 124 that is connected, for example, through a conduit for second product 122 to the filling machine 105, and these bottles B filled with a predetermined volume of liquid beverage filling material comprising the second product are then correspondingly labeled by a labeling module in the labeling arrangement or labeling station 108 having at least one labeling unit, device, or module for first product, each unit having a head, corresponding to this second product.

A third output, for example, formed by a conveyer arrangement 111 to convey incorrectly labeled bottles, removes any bottles B which have been incorrectly labeled as may have been determined by an inspecting device or an inspecting station, or an inspecting module 128 that may possibly form a part of the labeling arrangement or labeling station 108 having at least one labeling unit, device, or module for first product, each unit having a head.

In FIG. 1A item 112 is a central control arrangement or, expressed differently, a controller with a computer to process algorithms, which controls the operation of the above-referenced system or plant.

The beverage filling machine 105 is preferably of the revolving design, with a rotor 105', which revolves around a vertical machine axis. The rotor 105' is designed to handle the bottles B by the neck. A filling arrangement 114 having at least one filling device, element, apparatus, or valve, comprises an apparatus configured to introduce a predetermined volume of liquid beverage filling material into the interior of bottles B to a predetermined level of liquid beverage filling material. Furthermore, the filling device or apparatus comprises an apparatus configured to terminate the filling of bottles upon liquid beverage filling material reaching the predetermined level in bottles B. In other words, the filling arrangements 114 having at least one filling device, element, apparatus, or valve, are configured and disposed to provide a predetermined flow of liquid beverage filling material from the source thereof, such as, product mixers 123 and 124, into the bottles B.

The toroidal vessel 117 is a component, for example, of the revolving rotor 105'. The toroidal vessel 117 can be connected by means of a rotary coupling or a coupling that permits rotation, and by means of the conduit for first product 121 to the external reservoir or first product mixer 123 to supply the product.

As well as the more typical filling machines having one toroidal vessel, it is possible that in at least one possible embodiment a filling machine could possibly be utilized wherein each filling arrangement 114 having at least one filling device, element, apparatus, or valve is preferably connected by means of two connections to a toroidal vessel 117 which contains a first product, say by means of a first connection, for example, the conduit for first product 121, and to a second toroidal vessel which contains a second product, say by means of the second connection, for example, the conduit for second product 122. In this case, each filling arrangement 114 having at least one filling device, element, apparatus, or valve can also preferably have, at the connections, two individually-controllable fluid or control valves, so that in each bottle B which is delivered at the inlet of the filling machine 105 to a filling position 113, the first product or the second product can be filled by means of an appropriate control of the filling product or fluid valves.

It will be understood that while a two-product assembly or system of a bottling plant is illustrated in FIG. 1A, the disclosure is equally applicable to single-product installations, or other commensurate embodiments.

Figure 1B:
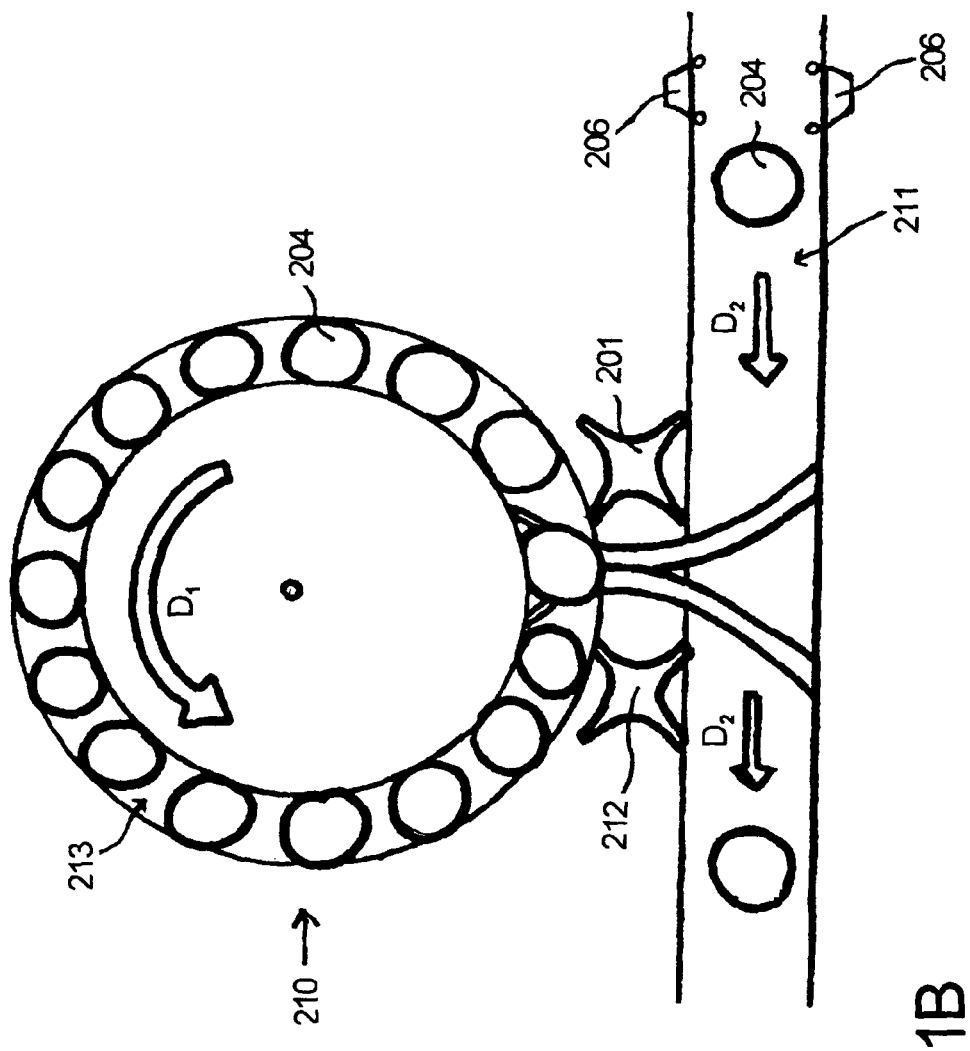
FIG. 1B shows an illustration of a beverage container handling machine according to one possible embodiment.

FIG. 1B shows a beverage container handling machine according to one possible embodiment. In the embodiment shown, beverage containers 204, such as kegs or barrels, are moved along a linear conveyor belt or similar device 211 in direction of movement $D_2$ to an input star wheel arrangement 201. The conveyor belt 211 is provided with guide elements 206 that can engage beverage containers 204 to center them or position them so they are properly oriented with respect to the input star wheel 201. The input star wheel 201 receives the beverage containers 204 in its pockets or arms. The input star wheel 201 then rotates to move the beverage containers 204 into a corresponding position in a rotary carousel 213 of a container handling station 210, which can be a filling station for filling the beverage containers 204 with a beverage, or other such machines as labeling machines or inspection and test machines. The rotary carousel 213 rotates counterclockwise in the direction $D_1$ as the beverage containers 204 are filled, labeled, or inspected according to the type of station in which the containers 204 are located. The beverage containers 204 are rotated around and into an output star wheel 212, which, in at least one embodiment, can be identical to the input star wheel. The output star wheel 212 guides the beverage containers 204 onto the linear conveyor belt 211, which in turn transports the containers to another section of the plant.

As can be seen in FIG. 1, the device for the feeding and removal of containers comprises a rotating star wheel 1 with receptacle pockets, arms 2 or prisms 8 in or against which the outer cylindrical surface 3 of a container is located during the transfer. The star pockets or arms 2 are preferably located in pairs on different levels with a corresponding space in between, and are operated by their own drive device 5 which is independent of the machine drive system. For this purpose, synchronous motors, stepper motors, servo motors and other suitable motors can be used, which can be driven and actuated so that they are synchronized in terms of speed or position and/or angle.

Because the device is driven by at least one drive motor of its own, and is not mechanically connected with the drive and/or rotational movements of the container handling machine itself, means such as a rotary encoder or position transmitter etc. are provided that guarantee a positioning of the containers at the correct interval, as well as a correct drive for the device, even after operational interruptions and/or a power failure.

Figure 2:
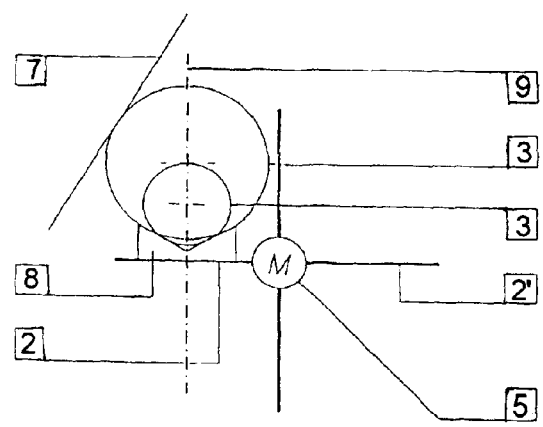
FIG. 2 shows a transfer star in a prismatic realization.

The working position or pushing position of the arms or prisms can be automatically adjusted to the different container diameters by a rotational adjustment with reference to the container diameter at its midpoint and the desired position of the container on the support plate of a revolving carousel, on a linear conveyor or in the handling position in the machine. The revolving movement of the star wheel or of the arms 2 or prisms 8 can be accelerated continuously, discontinuously, step-wise in different steps and also delayed, whereby preferably at the moment of the transfer, the speed at which the container 4 is moving and the speed of the conveyor speed or the speed of revolution of the handling machine are identical. Between the pushing or centering arms 2 or prisms 8, which are located at the desired interval, for example, there are guide elements 6 that can be moved into a corresponding terminal position depending on the container diameter. If the container 4 is not in the correct center position in relation to the revolving support plate or to the desired handling position, these guide elements steer the containers 4 into the required position. Said guide elements can be omitted with containers 4 that are moved forward in a centering track or on conveyor devices that have lateral guides, and downstream prism-shaped guides 8. Depending on the speed of rotation of the guide elements 2, additional pressure or guide elements 7 can be provided to fix the containers 4 in position. In the exemplary embodiment illustrated in FIG. 2, the face or guide arm 2' is equipped with a prism 8. In this configuration, containers with different diameters can always be transferred in a centered position. In practice, the center axis 9 of the prism coincides with the center of the receiving plane, the receptacle support plate etc. or can be made to coincide with it. The prism 8 can be moved on the face or the guide arm 2 to adjust to different center positions, or it can also be mounted so that it can be moved by means of a motor. When a prism 8 is used, all the guide arms or faces 2, 2' are advantageously equipped with such a prism.

Figure 1C:
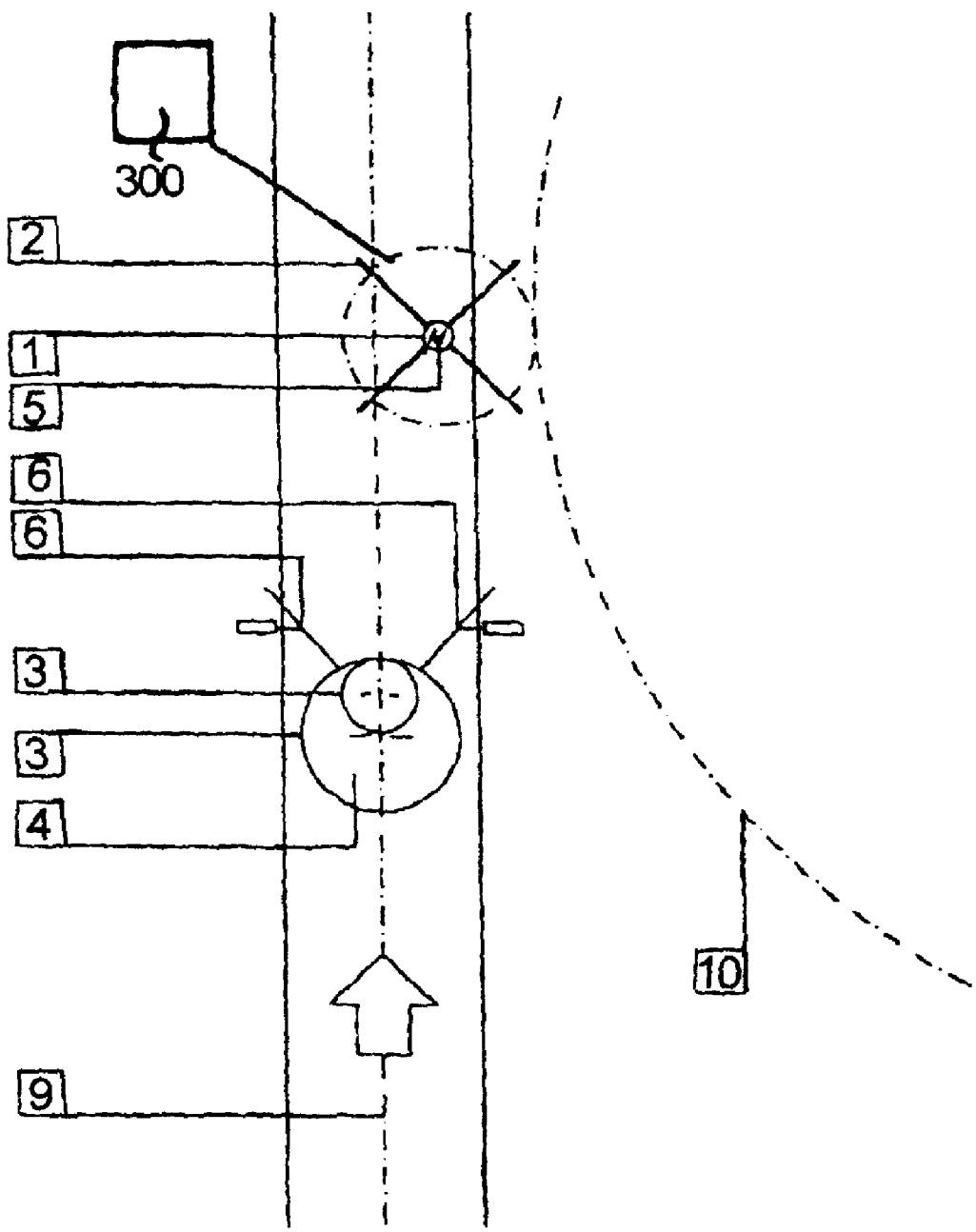
FIG. 1C shows the linear handling machine of FIG. 1 with additional detail.

FIG. 1C shows the linear handling machine of FIG. 1 with a control system 300 operatively connected to the rotating star wheel 1. The control system 300 can comprise a computer control system to control the movement and operation of the rotating star wheel 1.

Figure 3:
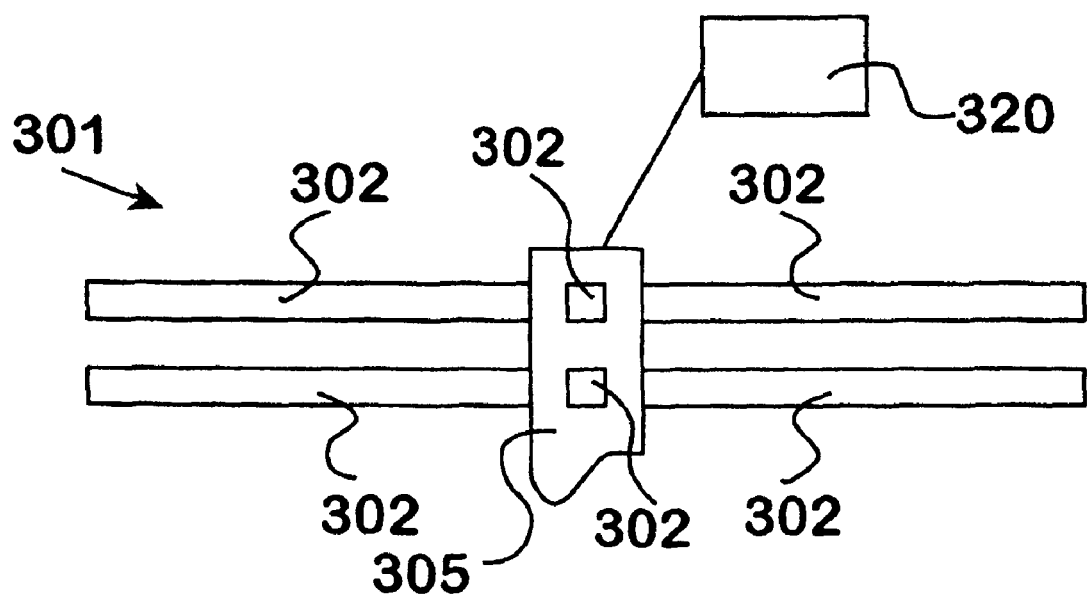
FIG. 3 shows a transfer star mechanism according to at least one possible embodiment.

FIG. 3 shows a transfer star mechanism 301 according to at least one possible embodiment for moving beverage containers to or from a conveyor system or container handling system in a beverage container handling plant. In this embodiment, the transfer star mechanism 301 comprises an upper group of star arms 302 and a lower group of star arms 302. These arms 302 are in pairs and project like spokes from a center column 305 which comprises at least one drive mechanism for movement of the star arms 302. A computerized control system 320 is operatively connected to the transfer star device 301 to control the movement of the transfer star device 301 and/or the star arms 302. In the embodiment shown, there are four pairs of star arms 302 (only three pairs are visible), but it should be understood that it is within the scope of this application for embodiments of the transfer star mechanism 301 to have more or less than four pairs of star arms 302.

Figure 4:
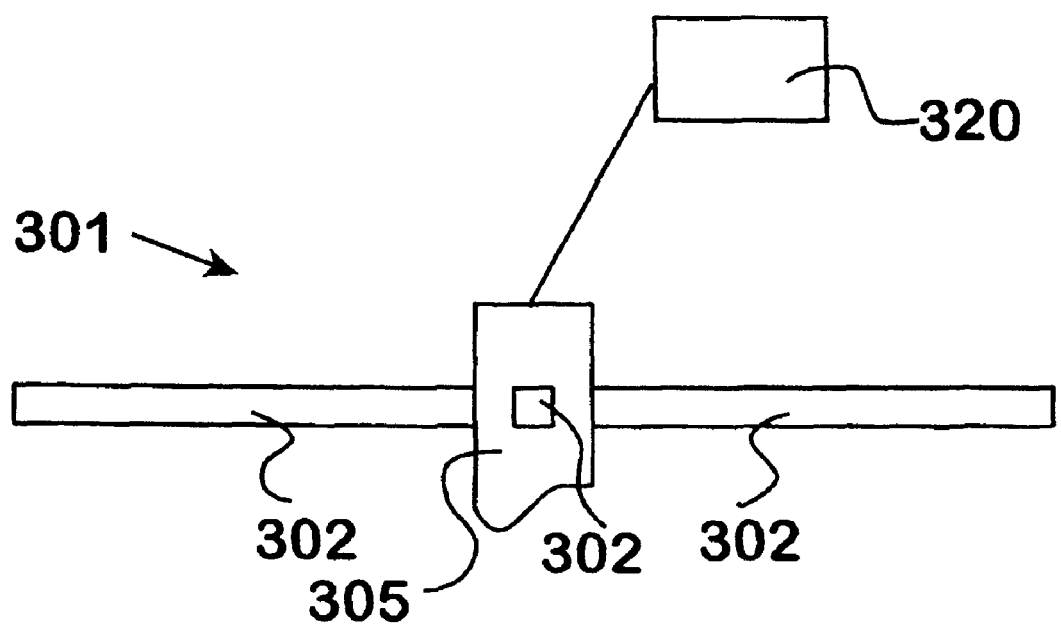
FIG. 4 shows a transfer star mechanism according to at least one possible embodiment.

FIG. 4 shows a transfer star mechanism 301 according to at least one possible embodiment. The embodiment shown is similar to that shown in FIG. 3, but with only one set of star arms 302.

In other possible embodiments, the arms of the transfer star device can be adjusted in a variety of ways as to their position and movement, as described herein. These various adjustment methods or structures can be used either individually or in any combination thereof to achieve an adjustable transfer star device to handle containers of various sizes and/or shapes and/or dimensions, in accordance with at least one possible embodiment.

In one possible embodiment, the speed or rate of rotation of the transfer star device can be adjusted according to the size of the containers to be transferred. The arms can be accelerated, decelerated, started and stopped, or otherwise moved in a non-constant, intermittent manner, according to the size of the containers to be transferred. This speed or movement adjustment can be accomplished by a drive device incorporating servo or stepper motors or other suitable motors. A computer program can control the operation of the transfer star device. The speed of rotation of the transfer star device can also be adjusted with respect to the speed of rotation of a corresponding rotary container handling station, such as a rotary filling machine, and/or the speed of movement of a corresponding conveyor belt or other similar conveyor structure.

In another possible embodiment, the transfer arms can be adjusted individually to create different-sized angles and thus different-sized star pockets for receiving and transferring containers of various sizes. The individual arms can be moved by motors and controlled by a computerized control system.

In another possible embodiment, the transfer star device can have an upper and lower set of star arms. The upper or lower set can be rotationally adjusted with respect to the other one of the upper or lower set that is non-rotational in order to create star pockets of different sizes to handle containers of different sizes. In at least one other possible embodiment, the star arms could be extended and retracted in a telescoping manner to increase or decrease the length of the star arms as desired.

One feature or aspect of an embodiment is believed at the time of the filing of this patent application to possibly reside broadly in a device for the feeding and removal of containers, in particular for the feeding of upright barrels, cans, bottles and similar containers from a conveyor belt to a linear conveyor or revolving carousel turntable or also for the return of said containers to a removal conveyor belt with a star wheel, the star pockets of which or the arms of which can be brought at least partly in contact with the container and which are realized so that they can be adjusted to accommodate different containers, characterized by the fact that the pushing and/or centering arms or prisms of the star wheel can be driven independently, and their rotational position can be adjusted to the different container diameter by rotational adjustment with reference to the center of the container, to the diameter of the cylindrical portion of the container and to the required position of the container in the machine.

Another feature or aspect of an embodiment is believed at the time of the filing of this patent application to possibly reside broadly in a device for the feeding and removal of containers, characterized by the fact that the pushing and/or centering arms or prisms of the star wheel and/or slide can be advanced or retracted by the angle required to compensate for the offset of the center of the respective different container diameters and/or can be brought into the pushing position.

Yet another feature or aspect of an embodiment is believed at the time of the filing of this patent application to possibly reside broadly in a device for the feeding and removal of containers, characterized by the fact that the pushing and/or centering arms or prisms of the star wheel move the center of the container onto the center of the receiving plane of a linear conveyor or the support plates of a revolving handling machine by advancing or retracting the feeder speeds.

Still another feature or aspect of an embodiment is believed at the time of the filing of this patent application to possibly reside broadly in a device for the feeding and removal of containers, characterized by the fact that the arms or prisms of the star wheel move the centers of the containers at the correct intervals to the center of the receiving or conveyor plane of a linear handling machine.

A further feature or aspect of an embodiment is believed at the time of the filing of this patent application to possibly reside broadly in a device for the feeding and removal of containers, characterized by the fact that at least the inlet-side star wheel is driven by its own motor and can be actuated and/or adjusted separately.

Another feature or aspect of an embodiment is believed at the time of the filing of this patent application to possibly reside broadly in a device for the feeding and removal of containers, characterized by the fact that this motor can be actuated both synchronously as well as relatively synchronously and/or step-wise in relation to the movement of the work stations of the handling machine.

Yet another feature or aspect of an embodiment is believed at the time of the filing of this patent application to possibly reside broadly in a device for the feeding and removal of containers, characterized by the fact that the star arms and/or prisms can be brought synchronized in terms of angle or position with the center axes of the receiving plate of the carousel turntable or of the linear handling position.

Still another feature or aspect of an embodiment is believed at the time of the filing of this patent application to possibly reside broadly in a device for the feeding and removal of containers, characterized by the fact that a guide element that steers the containers into the centered position with respect to the center of the support plates or receiving plane is provided in the transfer area.

A further feature or aspect of an embodiment is believed at the time of the filing of this patent application to possibly reside broadly in a device for the feeding and removal of containers, characterized by the fact that the position of the guide element can be set automatically as a function of the size of the container to be processed.

Another feature or aspect of an embodiment is believed at the time of the filing of this patent application to possibly reside broadly in a device for the feeding and removal of containers, characterized by the fact that the transfer star wheel has the same speed as the transferring conveyor element and the support plate or conveyor has the same speed as the receiving conveyor element and vice-versa, not later than at the transfer point.

Yet another feature or aspect of an embodiment is believed at the time of the filing of this patent application to possibly reside broadly in a device for the feeding and removal of containers, characterized by the fact that the faces or guide arms are realized in the shape of a prism to accommodate containers of different sizes.

Still another feature or aspect of an embodiment is believed at the time of the filing of this patent application to possibly reside broadly in a device for the feeding and removal of containers, characterized by the fact that the center axis of the prism coincides or can be made to coincide with the center of the receiving plane.

A further feature or aspect of an embodiment is believed at the time of the filing of this patent application to possibly reside broadly in a device for the feeding and removal of containers, characterized by the fact that the prism is mounted so that it can be pushed or moved by a motor on the face or on the guide arm to adjust to different center positions.

Another feature or aspect of an embodiment is believed at the time of the filing of this patent application to possibly reside broadly in a beverage bottling plant for filling bottles with a liquid beverage filling material having a device for the feeding and removal of containers, in particular for the feeding of upright barrels, cans, bottles and similar containers from a conveyor belt to a linear conveyor or revolving carousel turntable or also for the return of said containers to a removal conveyor belt with a star wheel, the star pockets of which or the arms of which can be brought at least partly in contact with the container and which are realized so that they can be adjusted to accommodate different containers, whereby the pushing and/or centering arms or prisms of the star wheel can be driven independently, and their rotational position can be adjusted to the different container diameter by rotational adjustment with reference to the center of the container, to the diameter of the cylindrical portion of the container and to the required position of the container in the machine.

Yet another feature or aspect of an embodiment is believed at the time of the filing of this patent application to possibly reside broadly in a beverage container filling plant for filling beverage containers, such as beverage bottles, beverage kegs, beverage barrels, beverage drums, and beverage cans, with a liquid beverage, said beverage container filling plant comprising: a rotatable beverage container cleaning machine being configured and disposed to clean empty beverage containers; a feed arrangement to supply empty beverage containers to said beverage container cleaning machine; a rotatable beverage container filling machine being configured and disposed to fill empty beverage containers with liquid beverage material; said beverage container filling machine comprising a plurality of beverage container filling devices for filling beverage containers with liquid beverage material; at least one storage unit being configured and disposed to store a supply of liquid beverage material; at least one supply line being configured and disposed to connect said at least one storage unit to said beverage container filling machine to supply liquid beverage material to said beverage container filling machine; a first conveyer arrangement being configured and disposed to move empty beverage containers from said beverage container cleaning machine into said beverage container filling machine; said first conveyer arrangement comprising: a first linear conveyor device to move empty beverage containers from said beverage container cleaning machine to said beverage container filling machine; a first output star wheel structure to move empty beverage containers from said beverage container cleaning machine to said first conveyor device; and a first input star wheel structure to move empty beverage containers from said first conveyor device into said beverage container filling machine; a rotatable beverage container closing machine being configured and disposed to close tops of filled beverage containers; a second conveyer arrangement being configured and disposed to move filled beverage containers from said beverage container filling machine into said beverage container closing machine; said second conveyer arrangement comprising: a second linear conveyor device to move filled beverage containers from said beverage container filling machine to said beverage container closing machine; a second output star wheel structure to move filled beverage containers from said beverage container filling machine to said second conveyor device; and a second input star wheel structure to move filled beverage containers from said second conveyor device into said beverage container closing machine; a rotatable beverage container labeling machine being configured and disposed to label filled, closed beverage containers; a third conveyer arrangement being configured and disposed to move filled, closed beverage containers from said beverage container closing machine into said beverage container labeling machine; said third conveyer arrangement comprising: a third linear conveyor device to move filled, closed beverage containers from said beverage container closing machine to said beverage container labeling machine; a third output star wheel structure to move filled, closed beverage containers from said beverage container closing machine to said third conveyor device; and a third input star wheel structure to move filled, closed beverage containers from said third conveyor device into said beverage container labeling machine; each of said star wheel structures comprises projecting star arms or prisms being configured to be brought at least partly in contact with beverage containers and to be adjusted to accommodate different beverage containers; and said star arms or prisms being configured to be driven independently and to be adjusted to accommodate different beverage container diameters by adjustment of their rotational position with reference to at least one of: the center of the beverage container, the diameter of the cylindrical portion of the beverage container, and the required position of the beverage container in one of said beverage container filling, closing, and labeling machines.

The components disclosed in the various publications, disclosed or incorporated by reference herein, may possibly be used in possible embodiments of the present invention, as well as equivalents thereof.

An example of a keg handling system and components thereof that may be possibly be utilized or possibly adapted for use in at least one possible embodiment of the present application may possibly be the INNOKEG CONTIKEG system manufactured by KHS Till GmbH, located at Kapelenstrasse 47-49, D-65830 Kriftel, Federal Republic of Germany. The INNOKEG CONTIKEG brochure, entitled "Innokeg Contikeg High Speed Continuous Keg Cleaning and Filling Machine," having publication number 30 1992-01-120/2 2 1100 O and being published by KHS Till GmbH, is incorporated by reference as if being set forth in its entirety herein. Other devices and systems relating to the INNOKEG CONTIKEG system, which are also manufactured by KHS Till GmbH, and components thereof that may be possibly be utilized or possibly adapted for use in at least one possible embodiment of the present application may possibly be VisuKeg 2000, which is the PC supported visualization program for computerized handling and control of the Contikeg plant and for the demonstration of the machine and plant processes.

Some examples of bottling systems that may possibly be utilized or possibly adapted for use in at least one possible embodiment of the present application may possibly be found in the following U.S. patents, all assigned to the Assignee herein, namely: U.S. Pat. Nos. 4,911,285; 4,944,830; 4,950,350; 4,976,803; 4,981,547; 5,004,518; 5,017,261; 5,062,917; 5,062,918; 5,075,123; 5,078,826; 5,087,317; 5,110,402; 5,129,984; 5,167,755; 5,174,851; 5,185,053; 5,217,538; 5,227,005; 5,413,153; 5,558,138; 5,634,500; 5,713,403; 6,276,113; 6,213,169; 6,189,578; 6,192,946; 6,374,575; 6,365,054; 6,619,016; 6,474,368; 6,494,238; 6,470,922; and 6,463,964.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of stepping motors that may possibly be utilized or possibly adapted for use in at least one possible embodiment of the present application may possibly be found in the following U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of sensors that may possibly be utilized or possibly adapted for use in at least one possible embodiment of the present application may possibly be found in the following U.S. Pat. No. 6,062,248 issued to Boelkins on May 16, 2000; U.S. Pat. No. 6,223,593 issued to Kubisiak et al. on May 1, 2001; U.S. Pat. No. 6,466,035 issued to Nyfors et al. on Oct. 15, 2002; U.S. Pat. No. 6,584,851 issued to Yamagishi et al. on Jul. 1, 2003; U.S. Pat. No. 6,631,638 issued to James et al. on Oct. 14, 2003; and U.S. Pat. No. 6,707,307 issued to McFarlane et al. on Mar. 16, 2004.

All, or substantially all, of the components and methods of the various embodiments may be used with at least one embodiment or all of the embodiments, if more than one embodiment is described herein.

Some examples of servo-motors that may possibly be utilized or possibly adapted for use in at least one possible embodiment of the present application may possibly be found in the following U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025 issued to Yasui on Feb. 15, 2000.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Some examples of bottling systems which may possibly be utilized or adapted for use in at least one possible embodiment may possibly be found in the following U.S. Pat. No. 6,684,602, entitled "Compact bottling machine;" U.S. Pat. No. 6,470,922, entitled "Bottling plant for bottling carbonated beverages;" U.S. Pat. No. 6,390,150, entitled "Drive for bottling machine;" U.S. Pat. No. 6,374,575, entitled "Bottling plant and method of operating a bottling plant;" U.S. Pat. No. 6,192,946, entitled "Bottling system;" U.S. Pat. No. 6,185,910, entitled "Method and an apparatus for high-purity bottling of beverages;" U.S. Pat. No. 6,058,985, entitled "Bottling machine with a set-up table and a set-up table for a bottling machine and a set-up table for a bottle handling machine;" U.S. Pat. No. 5,996,322, entitled "In-line bottling plant;" U.S. Pat. No. 5,896,899, entitled "Method and an apparatus for sterile bottling of beverages;" U.S. Pat. No. 5,848,515, entitled "Continuous-cycle sterile bottling plant;" U.S. Pat. No. 5,634,500, entitled "Method for bottling a liquid in bottles or similar containers;" and U.S. Pat. No. 5,425,402, entitled "Bottling system with mass filling and capping arrays."

All of the patents, patent applications and publications recited herein, and in the Declaration attached hereto, are hereby incorporated by reference as if set forth in their entirety herein.

Some examples of starwheels which may possibly be utilized or adapted for use in at least one possible embodiment may possibly be found in the following U.S. Pat. No. 5,613,593, entitled "Container handling starwheel;" U.S. Pat. No. 5,029,695, entitled "Improved starwheel;" U.S. Pat. No. 4,124,112, entitled "Odd-shaped container indexing starwheel;" and U.S. Pat. No. 4,084,686, entitled "Starwheel control in a system for conveying containers."

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some examples of beverage bottling systems which may possibly be utilized or adapted for use in at least one possible embodiment may possibly be found in the following U.S. patents, and are hereby incorporated by reference as if set forth in their entirety herein: U.S. Pat. No. 6,494,238, entitled "Plant for filling beverage into beverage bottles and other beverage containers having apparatus for replacing remaining air volume in filled beverage bottles or other beverage containers;" U.S. Pat. No. 6,474,368, entitled "Beverage container filling machine, and method for filling containers with a liquid filling material in a beverage container filling machine;" U.S. Pat. No. 6,470,922, entitled "Bottling plant for bottling carbonated beverages;" U.S. Pat. No. 6,463,964, entitled "Method of operating a machine for filling bottles, cans or the like beverage containers with a beverage, and a beverage container filling machine;" U.S. Pat. No. 6,374,575, entitled "Bottling plant and method of operating a bottling plant;" U.S. Pat. No. 6,365,054, entitled "Plant for filling containers and a method for operating a plant for filling containers;" U.S. Pat. No. 6,192,946, entitled "Bottling system;" U.S. Pat. No. 6,189,578, entitled "Filling system and filling element;" U.S. Pat. No. 6,058,985, entitled "Bottling machine with a set-up table and a set-up table for a bottling machine and a set-up table for a bottle handling machine;" U.S. Pat. No. 5,713,403, entitled "Method and system for filling containers with a liquid filling product, and filling machine and labelling device for use with this method or system," U.S. Pat. No. 5,634,500, entitled "Method for bottling a liquid in bottles or similar containers;" and U.S. Pat. No. 5,413,153, entitled "Container filling machine for filling open-top containers, and a filler valve therefor."

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The corresponding foreign and international patent publication applications, namely, Federal Republic of Germany Patent Application No. 103 52 885.7-22, filed on Nov. 10, 2003, having inventor Alois MONZEL, and DE-OS 103 52 885.7-22 and DE-PS103 52 885.7-22, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A transport arrangement configured to move containers comprising barrels, cans, bottles, or similar containers, from an input conveyor to a linear or rotary conveyor, or configured to return said containers to an output conveyor, said transport arrangement comprising a star wheel, wherein said star wheel comprises independently-moveable container pushing and/or centering arms, each realized in the shape of a prism to accommodate containers of different sizes, the rotational position of which is adjustable to different container diameters by rotational adjustment with reference to: the center of the container, the diameter of the cylindrical portion of the container, and the required position of the container in said linear or rotary conveyor.

2. The transport arrangement according to claim 1, wherein the pushing and/or centering arms, comprising prisms, of the star wheel and/or slide can be advanced or retracted by the angle required to compensate for the offset of the center of the respective different container diameters and/or can be brought into the pushing position.

3. The transport arrangement according to claim 2, wherein the pushing and/or centering arms, comprising prisms, of the star wheel move the center of the container onto the center of the receiving plane of a linear conveyor or the support plates of a revolving handling machine by advancing or retracting the feeder speeds.

4. The transport arrangement according to claim 3, wherein the arms, comprising prisms, of the star wheel move the centers of the containers at predetermined intervals to the center of the receiving or conveyor plane of a linear handling machine, and at least the inlet-side star wheel is driven by its own motor and can be actuated and/or adjusted separately.

5. The transport arrangement according to claim 4, wherein this motor can be actuated both synchronously as well as relatively synchronously and/or step-wise in relation to the movement of the work stations of the handling machine, and the star arms, comprising prisms, can be synchronized in terms of angle or position with the center axes of the receiving plate of the carousel turntable or of the linear handling position.

6. The transport arrangement according to claim 5, wherein said transport arrangement comprises a guide element disposed in the transfer area and configured to steer the containers into the centered position with respect to the center of the support plates or receiving plane, the position of the guide element can be set automatically as a function of the size of the container to be processed, and the transfer star wheel has the same speed as the transferring conveyor element and the support plate or conveyor has the same speed as the receiving conveyor element and vice-versa, not later than at the transfer point.

7. The transport arrangement according to claim 6, wherein the faces or guide arms, each realized in the shape of a prism, are configured to accommodate containers of different sizes, the center axis of the prism coincides or can be made to coincide with the center of the receiving plane, and the prism is mounted so that it can be pushed or moved by a motor on the face or on the guide arm to adjust to different center positions.

8. Device as recited in the introduction to claim 1, characterized by the fact that the pushing and/or centering arms, comprising prisms (2, 2', 8), of the star wheel and/or slide can be advanced or retracted by the angle required to compensate for the offset of the center of the respective different container diameters and/or can be brought into the pushing position.

9. Device as claimed in claim 8, characterized by the fact that the pushing and/or centering arms, comprising prisms (2, 2', 8), of the star wheel move the center of the container onto the center of the receiving plane of a linear conveyor or the support plates of a revolving handling machine by advancing or retracting the feeder speeds.

10. Device as claimed in claim 9, characterized by the fact that the arms, comprising prisms (2, 2', 8), of the star wheel move the centers of the containers at the correct intervals to the center of the receiving or conveyor plane of a linear handling machine.

11. Device as claimed in claim 10, characterized by the fact that at least the inlet-side star wheel is driven by its own motor (5) and can be actuated and/or adjusted separately.

12. Device as claimed in claim 11, characterized by the fact that this motor (5) can be actuated both synchronously as well as relatively synchronously and/or step-wise in relation to the movement of the work stations of the handling machine.

13. Device as claimed in claim 12, characterized by the fact that the star arms, comprising prisms (2, 2', 8), can be brought synchronized in terms of angle or position with the center axes (9) of the receiving plate of the carousel turntable (10) or of the linear handling position.

14. Device as claimed in claim 13, characterized by the fact that a guide element (6) that steers the containers (4) into the centered position with respect to the center of the support plates or receiving plane is provided in the transfer area.

15. Device as claimed in claim 14, characterized by the fact that the position of the guide element (6) can be set automatically as a function of the size of the container to be processed.

16. Device as claimed in claim 15, characterized by the fact that the transfer star wheel has the same speed as the transferring conveyor element and the support plate or conveyor has the same speed as the receiving conveyor element and vice-versa, not later than at the transfer point.

17. Device as claimed in claim 16, characterized by the fact that the center axis (9) of the prism coincides or can be made to coincide with the center of the receiving plane.

18. Device as claimed in claim 17, characterized by the fact that the prism (8) is mounted so that it can be pushed or moved by a motor on the face or on the guide arm (2, 2') to adjust to different center positions.

\* \* \* \* \*